United States Patent
Yang et al.

(10) Patent No.: US 10,129,617 B2
(45) Date of Patent: Nov. 13, 2018

(54) LINK SWITCHING METHOD, DEVICE, AND SYSTEM

(71) Applicant: Huawei Technologies Co., Ltd., Shenzhen (CN)

(72) Inventors: He Yang, Shenzhen (CN); Yiming Wang, München (DE)

(73) Assignee: HUAWEI TECHNOLOGIES CO., LTD, Shenzhen, Guangdong (CN)

(*) Notice: Subject to any disclaimer, the term of this patent is extended or adjusted under 35 U.S.C. 154(b) by 0 days.

(21) Appl. No.: 14/837,977

(22) Filed: Aug. 27, 2015

(65) Prior Publication Data

US 2015/0365742 A1 Dec. 17, 2015

Related U.S. Application Data

(63) Continuation of application No. PCT/CN2014/072935, filed on Mar. 5, 2014.

(51) Int. Cl.
*H04Q 11/00* (2006.01)
*H04L 12/26* (2006.01)
(Continued)

(52) U.S. Cl.
CPC ..... *H04Q 11/0067* (2013.01); *H04L 41/0659* (2013.01); *H04L 43/0811* (2013.01);
(Continued)

(58) Field of Classification Search
CPC ........... H04Q 11/0067; H04Q 11/0071; H04Q 2011/0081
See application file for complete search history.

(56) References Cited

U.S. PATENT DOCUMENTS

2002/0021472 A1* 2/2002 Nakaishi ............. H04J 14/0282
398/168
2009/0047931 A1 2/2009 Nanda et al.
(Continued)

FOREIGN PATENT DOCUMENTS

CN 101651495 2/2010
CN 101995606 3/2011
(Continued)

OTHER PUBLICATIONS

"Ethernet linear protection switching," ITU-T Telecommunication Standardization Sector of ITU, G.8031/Y.1342, Amendment 1—Clarifications to APS format, International Telecommunication Union, Aug. 2013, 8 pp.

*Primary Examiner* — Nathan Cors
(74) *Attorney, Agent, or Firm* — Womble Bond Dickinson (US) LLP

(57) ABSTRACT

Embodiments of the present invention provide a link switching method, device, and system. The method comprises: an optical network unit (ONU) transmits a monitoring packet through a first Maintenance association End Point on a first link connected to the ONU and an aggregation side switch device, so as to monitor the first link; the ONU performs switching from a first sub-link of the first link to a first sub-link of a second link if it is detected that a link fault occurs on the first link; the ONU sends a notification message to a second optical line terminal (OLT), so that the second OLT enables a transmission port; and the ONU sends an automatic protection switching message to the aggregation side switch device through a second Maintenance association End Point on the second link.

10 Claims, 12 Drawing Sheets

(51) Int. Cl.
*H04L 12/707* (2013.01)
*H04L 12/24* (2006.01)
*H04L 12/703* (2013.01)

(52) U.S. Cl.
CPC .............. *H04L 43/10* (2013.01); *H04L 45/22* (2013.01); *H04L 45/28* (2013.01); *H04Q 2011/0081* (2013.01)

(56) References Cited

U.S. PATENT DOCUMENTS

| | | | | |
|---|---|---|---|---|
| 2010/0232794 | A1* | 9/2010 | Zheng | H04J 3/1694 398/68 |
| 2010/0310252 | A1* | 12/2010 | Healey | H04B 10/032 398/6 |
| 2012/0134664 | A1* | 5/2012 | Zheng | H04L 45/22 398/5 |
| 2012/0195589 | A1 | 8/2012 | Nors | |
| 2012/0251097 | A1 | 10/2012 | Elmardini et al. | |
| 2013/0259482 | A1* | 10/2013 | Sarashina | H04B 10/27 398/67 |
| 2014/0000352 | A1 | 1/2014 | Gueit et al. | |
| 2014/0099097 | A1* | 4/2014 | Zheng | H04L 41/0663 398/5 |
| 2014/0178067 | A1 | 6/2014 | Cheng | |
| 2014/0219654 | A1* | 8/2014 | Mitsui | H04Q 11/0067 398/45 |
| 2014/0321845 | A1* | 10/2014 | Jiang | H04Q 11/0067 398/5 |
| 2015/0003822 | A1* | 1/2015 | Fukada | H04B 10/032 398/2 |
| 2016/0295307 | A1* | 10/2016 | Kikuzawa | H04Q 11/0067 |

FOREIGN PATENT DOCUMENTS

| | | | |
|---|---|---|---|
| CN | 102025540 | 4/2011 | |
| CN | 102263587 | 11/2011 | |
| CN | 102369737 | 3/2012 | |
| RU | 2461967 C2 | 9/2012 | |
| WO | 2012120218 A2 | 9/2012 | |
| WO | 2012177634 A1 | 12/2012 | |
| WO | WO2013/091471 A * | 6/2013 | ............. H04L 12/24 |

* cited by examiner

```
┌─────────────────────────────────────────────────────────────┐
│ An optical network unit transmits a monitoring packet       │
│ through a first Maintenance association End Point on a      │
│ first link connected to the optical network unit and an     │──── 101
│ aggregation side switch device, so as to monitor the first  │
│ link, where the first link includes a first sub-link        │
│ between the optical network unit and a first optical line   │
│ terminal, and a second sub-link between the first optical   │
│ line terminal and the aggregation side switch device        │
└─────────────────────────────────────────────────────────────┘
                              │
                              ▼
┌─────────────────────────────────────────────────────────────┐
│ The optical network unit performs switching from the first  │
│ sub-link of the first link to a first sub-link of a second  │
│ link if it is detected that a link fault occurs on the      │──── 102
│ first link, where the second link is a link, except the     │
│ first link, between the optical network unit and the        │
│ aggregation side switch device, and the first sub-link of   │
│ the second link is a link between the optical network unit  │
│ and a second optical line terminal                          │
└─────────────────────────────────────────────────────────────┘
                              │
                              ▼
┌─────────────────────────────────────────────────────────────┐
│ The optical network unit sends a notification message to    │
│ the second optical line terminal, where the notification    │
│ message is used to notify the second optical line terminal  │──── 103
│ of occurrence of link switching and a cause for the         │
│ switching, so that the second optical line terminal enables │
│ a transmission port                                         │
└─────────────────────────────────────────────────────────────┘
                              │
                              ▼
┌─────────────────────────────────────────────────────────────┐
│ The optical network unit sends an automatic protection      │
│ switching message to the aggregation side switch device     │
│ through a second Maintenance association End Point on the   │
│ second link, where the automatic protection switching       │
│ message is used to notify the aggregation side switch       │──── 104
│ device of the occurrence of the link switching, so that     │
│ the aggregation side switch device performs switching from  │
│ the second sub-link of the first link to a second sub-link  │
│ of the second link after receiving the automatic protection │
│ switching message, where the second sub-link of the second  │
│ link is a link between the aggregation side switch device   │
│ and the second optical line terminal                        │
└─────────────────────────────────────────────────────────────┘
```

FIG. 1

LINK SWITCHING METHOD, DEVICE, AND SYSTEM

This application is a continuation of International Application No. PCT/CN2014/072935, filed on Mar. 5, 2014, which is hereby incorporated by reference in its entirety.

TECHNICAL FIELD

The present invention relates to the field of communications, and in particular, to a link switching method, device, and system.

BACKGROUND

Dual-homing protection of a network device node is a network data backup method in which a network node is connected to two different network devices in another network area by using two links: an active link and a standby link, and network reliability is improved by means of mutual backup protection of the active link and the standby link. In the prior art, TYPE B and TYPE C/TYPE D protection technologies of extension lines are generally used to implement dual-homing protection of a node.

In TYPE B, network data backup is implemented by protecting active and standby PON ports of an OLT and active and standby optical fibers; and in TYPE C/TYPE D, network data backup is implemented by using two PON ports of the OLT, two PON ports of an ONU, and by dual redundancy of fiber trunks, optical splitters, and distributor fibers. Specific implementation manners of TYPE C/TYPE D include two types: protection of different PON MAC chips on a same PON board of the OLT, and protection of PON ports between PON boards.

In addition, the prior art provides a VALN-based Ethernet linear protection switching mechanism, namely, G.8031, where the protection switching mechanism is implemented by means of the APS (Automatic Protection Switching) protocol. The APS protocol is a protocol, specified in G.8031, that switching results of devices at two ends keep consistent in bidirectional protection switching, and an APS protocol packet can be sent only on a protection channel, but cannot be transferred on a working channel.

In the prior art, a segment protection scheme of G.8031 and TYPE B/C protection is used to implement network data backup, that is, OLT GE uplink dual-homing protection can be implemented by using G.8031 from the OLT to a CP, and an end-to-end service path is protected by means of G.8031 VLAN service channel protection; in addition, TYPE B and TYPE C dual-homing protection schemes are used in a PON, and a PON fiber trunk is protected by using a PON link level, thereby implementing network data backup.

However, in the segment protection scheme of G.8031 and TYPE B/C protection, according to definitions in the G.8031 standards, only two VLAN service channels, VLAN X and VLAN Y, that protect each other can be established between one OLT and a remote switch device ETH Switch, where the VLAN X is an active service channel and the VLAN Y is a backup service channel. When a fault occurs on the active service channel VLAN X, a service is switched to the backup service channel VLAN Y, so as to ensure that a service accessed by an ONT is normal. However, when a fault occurs on a PON between the ONT and one OLT, another OLT serves as a standby OLT and enables a PON port between the standby OLT and the ONT by means of dual-homing TYPE B protection, which allows a service on the ONT corresponding to the faulty PON to access a network by using the standby OLT. However, because the backup service channel VLAN Y is established on the ONT corresponding to the faulty PON, the standby OLT cannot perform G.8031 VLAN protection switching, and service interruption of an uplink Switch link cannot be notified to a PON side, so that linkage switching of the service on the PON side cannot be implemented; and disconnection of a PON can neither be associated with uplink link switching of a CP side, thereby resulting in interruption of the service accessed by the ONT. As a result, when the segment protection scheme is used in the uplink of the OLT, due to different protection schemes, deployment by a user is complex, end-to-end switching in a system is unpredictable, and real cross-device end-to-end service level switching cannot be implemented rapidly.

SUMMARY

Embodiments of the present invention provide a link switching method, device, and system, which provide a link switching mechanism, so as to implement rapid linkage switching of links between devices.

To achieve the foregoing objective, the embodiments of the present invention use the following technical solutions:

According to a first aspect, an optical network unit is provided, where the optical network unit includes a monitoring unit, configured to transmit a monitoring packet through a first Maintenance association End Point on a first link connected to an aggregation side switch device, so as to monitor the first link, where the first link includes a first sub-link between the optical network unit and a first optical line terminal, and a second sub-link between the first optical line terminal and the aggregation side switch device; a switching unit, configured to perform switching from the first sub-link of the first link to a first sub-link of a second link if it is detected that a link fault occurs on the first link, where the second link is a link, except the first link, between the optical network unit and the aggregation side switch device, and the first sub-link of the second link is a link between the optical network unit and a second optical line terminal; and a sending unit, configured to send a notification message to the second optical line terminal, where the notification message is used to notify the second optical line terminal of occurrence of link switching and a cause for the switching, so that the second optical line terminal enables a transmission port, where the sending unit is further configured to send an automatic protection switching message to the aggregation side switch device through a second Maintenance association End Point on the second link, where the automatic protection switching message is used to notify the aggregation side switch device of the occurrence of the link switching, so that the aggregation side switch device performs switching from the second sub-link of the first link to a second sub-link of the second link after receiving the automatic protection switching message, where the second sub-link of the second link is a link between the aggregation side switch device and the second optical line terminal With reference to the first aspect, in a first possible implementation manner, the link fault occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

With reference to the first possible implementation manner of the first aspect, in a second possible implementation manner, if the link fault occurring on the first link is the fault on the first sub-link of the first link or the fault in the downlink direction of the second sub-link of the first link, a maintenance unit is further configured to acquire, from the monitoring packet, information that the link fault occurring on the first link is the fault on the first sub-link of the first link or the fault in the downlink direction of the second sub-link of the first link.

With reference to the first possible implementation manner of the first aspect, in a third possible implementation manner, if the link fault occurring on the first link is the fault on the first sub-link of the first link, the notification message is a Physical Layer Operation Administration and Maintenance message.

With reference to the first possible implementation manner of the first aspect, in a fourth possible implementation manner, if the link fault occurring on the first link is the fault in the downlink direction of the second sub-link of the first link, the notification message is a PON Section Trace message; and after the service data transmission is switched successfully to the first sub-link of the second link, the sending unit is further configured to send an attribute value change notification to the first optical line terminal, where the attribute value change notification is used to notify the first optical line terminal of the occurrence of the link switching and the cause for the switching.

With reference to the first possible implementation manner of the first aspect, in a fifth possible implementation manner, if the link fault is the fault in the uplink direction of the second sub-link of the first link, the notification message is a PON Section Trace message, the optical network unit further includes a receiving unit, and before the monitoring unit acquires information about the link fault on the first link from the monitoring packet, the receiving unit is configured to receive the automatic protection switching message sent by the aggregation side switch device, so that after receiving the automatic protection switching message, the optical network unit acquires the information about the link fault on the first link by using the monitoring packet.

According to a second aspect, an aggregation side switch device is provided, where the aggregation side switch device includes a monitoring unit, configured to transmit a monitoring packet through a first Maintenance association End Point on a first link connected to an optical network unit, so as to monitor the first link, where the first link includes a first sub-link between the optical network unit and a first optical line terminal, and a second sub-link between the first optical line terminal and the aggregation side switch device; a receiving unit, configured to receive an automatic protection switching message that is sent through a second Maintenance association End Point on a second link by the optical network unit, where the automatic protection switching message is used to notify the aggregation side switch device of occurrence of link switching; and a switching unit, configured to perform switching from the second sub-link of the first link to a second sub-link of the second link after the automatic protection switching message is received, where the second sub-link of the second link is a link between the aggregation side switch device and a second optical line terminal.

With reference to the second aspect, in a first possible implementation manner, the link fault occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

With reference to the first possible implementation manner of the second aspect, in a second possible implementation manner, if the link fault occurring on the first link is the fault in the downlink direction of the second sub-link of the first link, the monitoring unit is further configured to acquire, from the monitoring packet, information that the link fault occurring on the first link is the fault in the downlink direction of the second sub-link of the first link; the switching unit is further configured to switch the service data transmission repeatedly between the second sub-link of the second link and the second sub-link of the first link at a preset frequency, and the switching unit stops the switching after the optical network unit receives the automatic protection switching message; and the aggregation side switch device further includes a sending unit, and the sending unit is configured to: after the switching unit switches the service data transmission between the second sub-link of the second link and the second sub-link of the first link, send the automatic protection switching message to the optical network unit by using the link on which no service data is transmitted.

According to a third aspect, a link switching system is provided, where the link switching system includes at least two optical line terminals, and the link switching system further includes the optical network unit in the first aspect and the aggregation side switch device in the second aspect.

According to a fourth aspect, a link switching method is provided, where the method includes transmitting, by an optical network unit, a monitoring packet through a first Maintenance association End Point on a first link connected to the optical network unit and an aggregation side switch device, so as to monitor the first link, where the first link includes a first sub-link between the optical network unit and a first optical line terminal, and a second sub-link between the first optical line terminal and the aggregation side switch device; performing, by the optical network unit, switching from the first sub-link of the first link to a first sub-link of a second link if it is detected that a link fault occurs on the first link, where the second link is a link, except the first link, between the optical network unit and the aggregation side switch device, and the first sub-link of the second link is a link between the optical network unit and a second optical line terminal; sending, by the optical network unit, a notification message to the second optical line terminal, where the notification message is used to notify the second optical line terminal of occurrence of link switching and a cause for the switching, so that the second optical line terminal enables a transmission port; and sending, by the optical network unit, an automatic protection switching message to the aggregation side switch device through a second Maintenance association End Point on the second link, where the automatic protection switching message is used to notify the aggregation side switch device of the occurrence of the link switching, so that the aggregation side switch device performs switching from the second sub-link of the first link to a second sub-link of the second link after receiving the automatic protection switching message, where the second sub-link of the second link is a link between the aggregation side switch device and the second optical line terminal With reference to the fourth aspect, in a first possible implementation manner, the link fault occurring on the first link is a fault on the first sub-link of the first link, where the fault on the first sub-link of the first link is a link fault detected by the optical network unit; a fault in a downlink direction of the second sub-link of the first link, where the downlink direction is a direction in which service data is transmitted from the aggregation side switch device to the first optical line terminal, and the fault in the downlink direction of the second sub-link of the first link is a link fault detected by the optical network unit; or a fault in an uplink direction of the second sub-link of the first link, where the uplink direction is a direction in which the service data is transmitted from the first optical line terminal to the aggregation side switch device, and the fault in the uplink direction of the second sub-link of the first link is a link fault detected by the aggregation side switch device.

With reference to the first possible implementation manner of the fourth aspect, in a second possible implementation manner, if the link fault is the fault on the first sub-link of the first link, the notification message is a Physical Layer Operation Administration and Maintenance message.

With reference to the first possible implementation manner of the fourth aspect, in a third possible implementation manner, if the link fault is the fault in the downlink direction of the second sub-link of the first link, the notification message is a PON Section Trace message; and after the service data transmission is switched successfully to the first sub-link of the second link, the method further includes: sending, by the optical network unit, an attribute value change notification to the first optical line terminal, where the attribute value change notification is used to notify the first optical line terminal of the occurrence of the link switching and the cause for the switching.

With reference to the first possible implementation manner of the fourth aspect, in a fourth possible implementation manner, if the link fault is the fault in the uplink direction of the second sub-link of the first link, the notification message is a PON Section Trace message; and before the optical network unit acquires information about the link fault on the first link by using the detection data, the method further includes: switching, by the aggregation side switch device after detecting the link fault, the service data transmission repeatedly between the second sub-link of the second link and the second sub-link of the first link at a preset frequency, so as to send the automatic protection switching message to the optical network unit by using the link on which no service data is transmitted; and stopping, by the aggregation side switch device, the switching after the optical network unit receives the automatic protection switching message.

The embodiments of the present invention provide a link switching method, device, and system, where an optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic flowchart of a link switching method according to an embodiment of the present invention;

DETAILED DESCRIPTION OF ILLUSTRATIVE EMBODIMENTS

Figure 2:
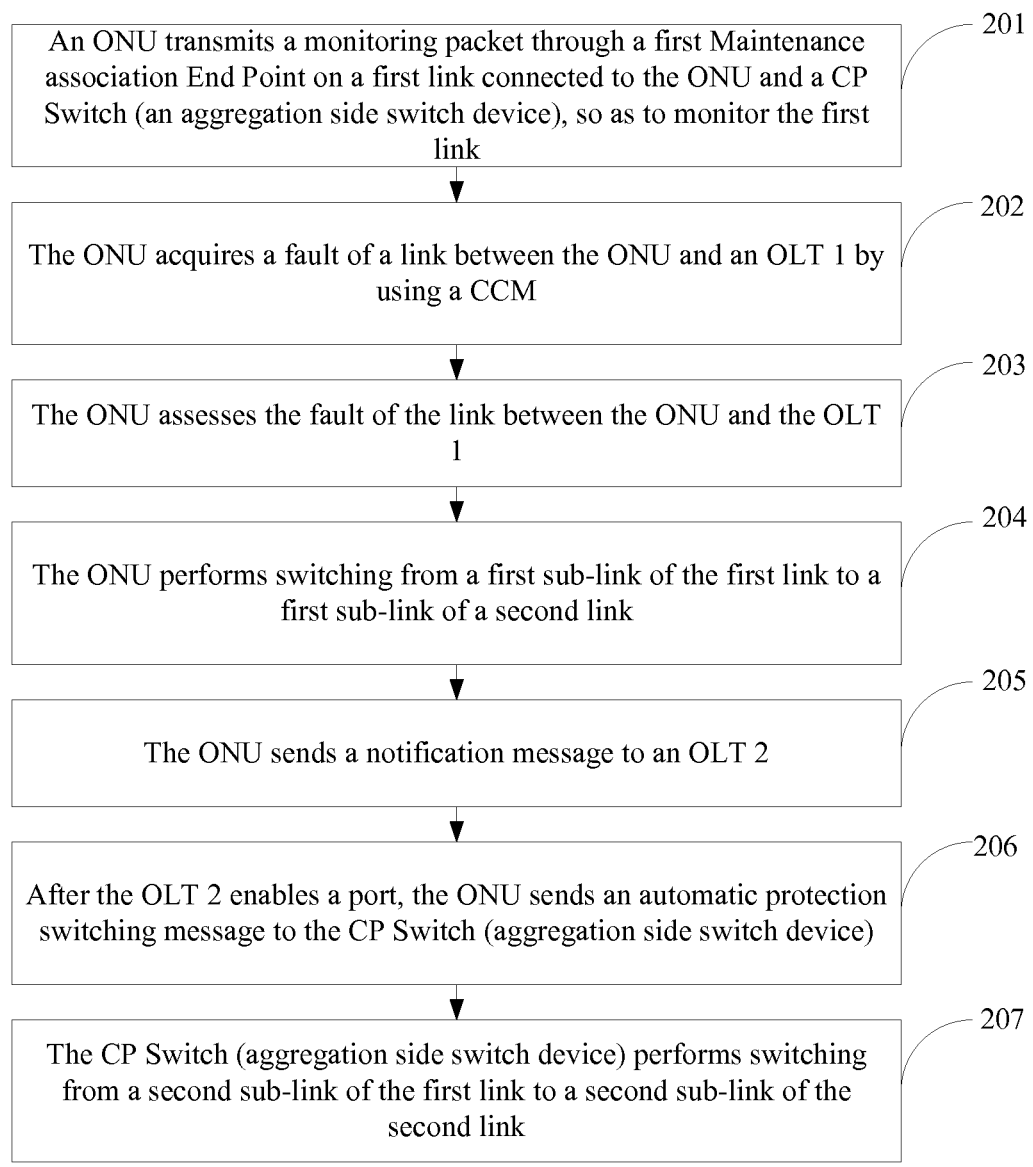
FIG. 2 is a schematic flowchart of another link switching method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An embodiment of the present invention provides a link switching method, and as shown in FIG. 1, the method includes the following steps.

101: An optical network unit transmits a monitoring packet through a first Maintenance association End Point on a first link connected to the optical network unit and an aggregation side switch device, so as to monitor the first link, where the first link includes a first sub-link between the optical network unit and a first optical line terminal, and a second sub-link between the first optical line terminal and the aggregation side switch device.

102: The optical network unit performs switching from the first sub-link of the first link to a first sub-link of a second link if it is detected that a link fault occurs on the first link, where the second link is a link, except the first link, between the optical network unit and the aggregation side switch device, and the first sub-link of the second link is a link between the optical network unit and a second optical line terminal

103: The optical network unit sends a notification message to the second optical line terminal, where the notification message is used to notify the second optical line terminal of occurrence of link switching and a cause for the switching, so that the second optical line terminal enables a transmission port.

104: The optical network unit sends an automatic protection switching message to the aggregation side switch device through a second Maintenance association End Point on the second link, where the automatic protection switching message is used to notify the aggregation side switch device of the occurrence of the link switching, so that the aggregation side switch device performs switching from the second sub-link of the first link to a second sub-link of the second link after receiving the automatic protection switching message, where the second sub-link of the second link is a link between the aggregation side switch device and the second optical line terminal This embodiment of the present invention provides a link switching method, where an optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

To make a person of ordinary skill in the art understand the technical solutions provided by this embodiment of the present invention more clearly, the following describes in detail, by using specific embodiments, a link switching method provided by an embodiment of the present invention. In this embodiment, it is assumed that a link fault is a fault of a link between an optical network unit and an optical line terminal, and in this embodiment, for ease of description, the optical network unit is represented as an ONU (Optical Network Unit), an aggregation side switch device is represented as a CP Switch (Communications Provider's Switch), and the optical line terminal is represented as an OLT (Optical Line Terminal), where a first optical line terminal is an OLT 1, and a second optical line terminal is an OLT 2. The link switching method provided by this embodiment of the present invention includes at least two OLTs, and for ease of description, this embodiment uses two OLTs as an example. As shown in FIG. 2, the method includes the following steps.

201: An ONU transmits a monitoring packet through a first Maintenance association End Point on a first link connected to the ONU and a CP Switch, so as to monitor the first link.

Specifically, the monitoring packet may be a CCM (Continuity Check Message), and a Maintenance association End Point MEP (Maintenance association End Point) is disposed on the ONU, so that the CCM may be transmitted through the MEP on each link, corresponding to the MEP, between the ONU and the CP Switch. For any one of the links, the ONU and the CP Switch monitors the link simultaneously by using the CCM.

202: The ONU acquires a fault of a link between the optical network unit and an OLT1 by using a CCM.

Figure 3:
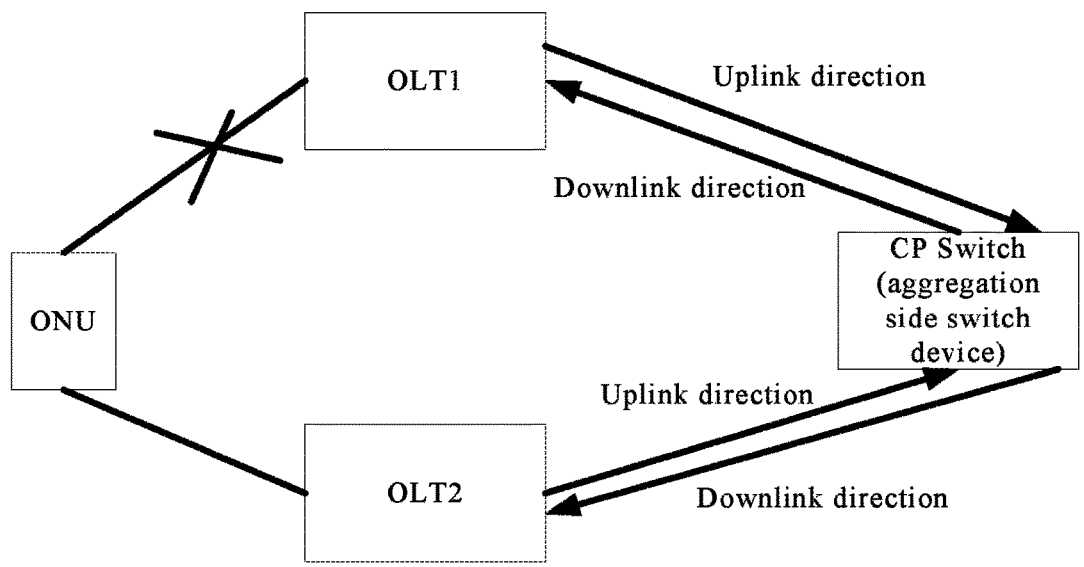
FIG. 3 is a schematic flowchart of another link switching method according to an embodiment of the present invention.

Specifically, as shown in FIG. 3, a fault occurs on a link between the ONU and the OLT 1. It is assumed that a link, between the OLT 1 and the CP Switch, on which a first MEP of the ONU is disposed is the first link, a link between the ONU and the OLT 1 is a first sub-link of the first link, and a link between the OLT 1 and the CP Switch is a second sub-link of the first link; and a link, between the OLT 2 and the CP Switch, on which a second MEP of the ONU is disposed is a second link, a link between the ONU and the OLT 2 is a first sub-link of the second link, and a link between the OLT 2 and the CP Switch is a second sub-link of the second link. In this case, the ONU detects, by using the CCM, that a fault occurs on the first sub-link of the first link between the ONU and the OLT 1, and acquires a location of the faulty link and fault information. The fault information may include a fault cause and the like.

It should be noted that the ONU and the OLT are mutually connected by using a splitter (Splitter), and various types of devices are also included between the OLT and the CP Switch. Connection lines in the figure are merely exemplary.

203: The ONU assesses the fault of the link between the ONU and the OLT 1.

Specifically, because the link fault detected by the ONU may be a fault caused by error information in a process of CCM transmission, instead of a real fault that occurs on the link between the ONU and the OLT 1. The CCM needs to confirm the fault of the link between the ONU and the OLT 1, so as to confirm that the link fault is indeed the fault that occurs on the link between the ONU and the OLT 1.

204: The ONU performs switching from a first sub-link of the first link to a first sub-link of a second link.

Specifically, the ONU performs switching from the link, corresponding to the first MEP, between the ONU and the OLT 1 to the link between the ONU and the OLT 2, that is, performs switching from the first sub-link of the first link to the first sub-link of the second link.

205: The ONU sends a notification message to an OLT 2.

Specifically, the message may be a PLOAM (Physical Layer Operation Administration and Maintenance) message. The PLOAM message is used to instruct the OLT 2 to enable a port.

206: After the OLT 2 enables a port, the ONU sends an automatic protection switching message to the CP Switch.

Specifically, the automatic protection switching message may be an APS (Automatic Protection Switching) message, and the APS message is used to notify the CP Switch of occurrence of link switching.

207: The CP Switch performs switching from the second sub-link of the first link to a second sub-link of the second link.

Specifically, the CP Switch performs switching from the link between the OLT 1 and the CP Switch to the link between the OLT 2 and the CP Switch, so as to implement switching of service data transmission from the first link to the second link.

This embodiment of the present invention provides a link switching method, where an optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

Figure 4:
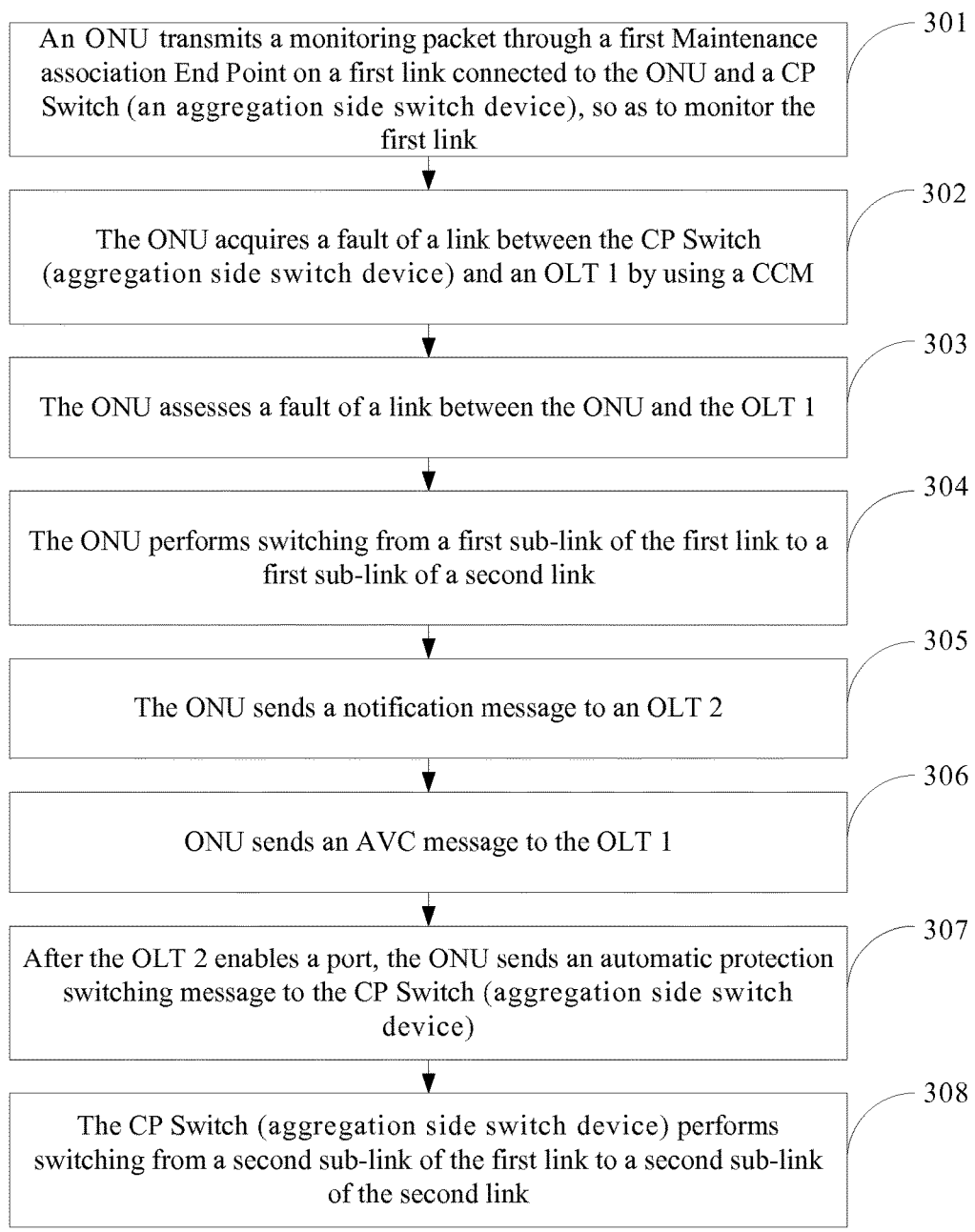
FIG. 4 is a schematic flowchart of another link switching method according to an embodiment of the present invention.

The present invention further provides a link switching method. In an embodiment, it is assumed that a link fault is a fault in a downlink direction of a second sub-link of a first link, and similar to the previous embodiment, in this embodiment, an optical network unit is represented as an ONU, an aggregation side switch device is represented as a CP Switch, and an optical line terminal is represented as an OLT, where a first optical line terminal is an OLT 1, and a second optical line terminal is an OLT 2. Similarly, the link switching method provided by this embodiment of the present invention includes at least two OLTs, and for ease of description, this embodiment uses two OLTs as an example. As shown in FIG. 4, the method includes the following steps.

301: An ONU transmits a monitoring packet through a first Maintenance association End Point on a first link connected to the ONU and a CP Switch, so as to monitor the first link.

In this embodiment, this step is the same as step 201 in the previous embodiment, and no details are repeatedly described herein.

302: The ONU acquires a fault of a link between the CP Switch and an OLT 1 by using a CCM.

Figure 5:
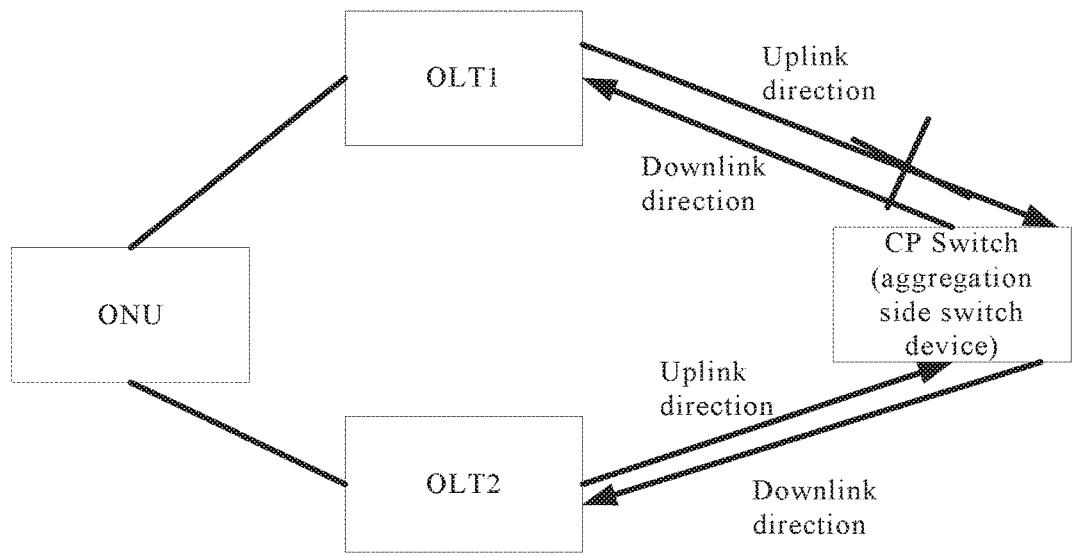
FIG. 5 is a schematic flowchart of another link switching method according to an embodiment of the present invention.

Specifically, as shown in FIG. 5, a fault occurs on a downlink link between the OLT 1 and the CP Switch, where definitions of the first link, a first sub-link of the first link, the second sub-link of the first link, a second link, a first sub-link of the second link, and a second sub-link of the second link are similar to those in the previous embodiment, and no details are repeatedly described herein. In this case, the ONU detects, by using the CCM, that a fault occurs on the downlink link of the second sub-link of the first link between the OLT 1 and the CP Switch, and acquires a location of the faulty link and fault information. The fault information may include a fault cause and the like.

303: The ONU assesses a fault of a link between the ONU and the OLT 1.

In this embodiment, this step is the same as step 203 in the previous embodiment, and no details are repeatedly described herein.

304: The ONU performs switching from a first sub-link of the first link to a first sub-link of a second link.

In this embodiment, this step is the same as step 204 in the previous embodiment, and no details are repeatedly described herein.

305: The ONU sends a notification message to an OLT 2.

Specifically, the message may be a PST (PON Section Trace) message. The PST message is used to instruct the OLT 2 to enable a port.

306: The ONU sends an AVC (Attribute Value Change) message to the OLT 1.

Specifically, the AVC message is used to notify the OLT 1 of successful link switching, so that the OLT 1 sets a link corresponding to the OLT 1 as a standby link.

307: After the OLT 2 enables a port, the ONU sends an automatic protection switching message to the CP Switch.

In this embodiment, this step is the same as step 206 in the previous embodiment, and no details are repeatedly described herein.

308: The CP Switch performs switching from a second sub-link of the first link to a second sub-link of the second link.

In this embodiment, this step is the same as step 206 in the previous embodiment, and no details are repeatedly described herein.

This embodiment of the present invention provides a link switching method, where an optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

Figure 6:
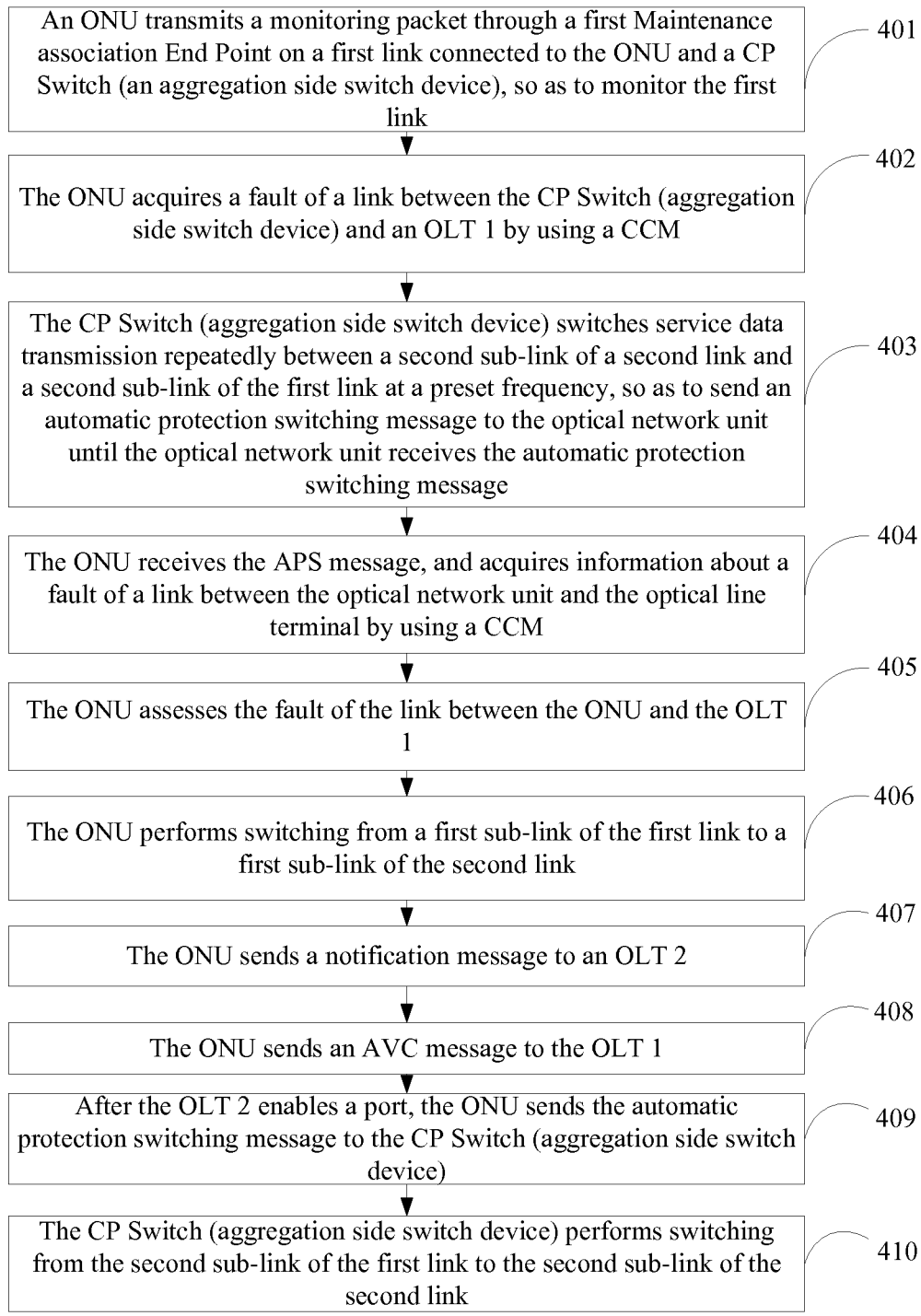
FIG. 6 is a schematic flowchart of another link switching method according to an embodiment of the present invention.

The present invention further provides a link switching method. In an embodiment, it is assumed that a link fault is a fault in an uplink direction of a second sub-link of a first link, and similar to the previous embodiment, in this embodiment, an optical network unit is represented as an ONU, an aggregation side switch device is represented as a CP Switch, and an optical line terminal is represented as an OLT, where a first optical line terminal is an OLT 1, and a second optical line terminal is an OLT 2. Similarly, the link switching method provided by this embodiment of the present invention includes at least two OLTs, and for ease of description, this embodiment uses two OLTs as an example. As shown in FIG. 6, the method includes the following steps.

401: An ONU transmits a monitoring packet through a first Maintenance association End Point on a first link connected to the ONU and a CP Switch, so as to monitor the first link.

In this embodiment, this step is the same as step 201 in the previous embodiment, and no details are repeatedly described herein.

402: The CP Switch acquires a fault of a link between the CP Switch and an OLT 1 by using a CCM.

Figure 7:
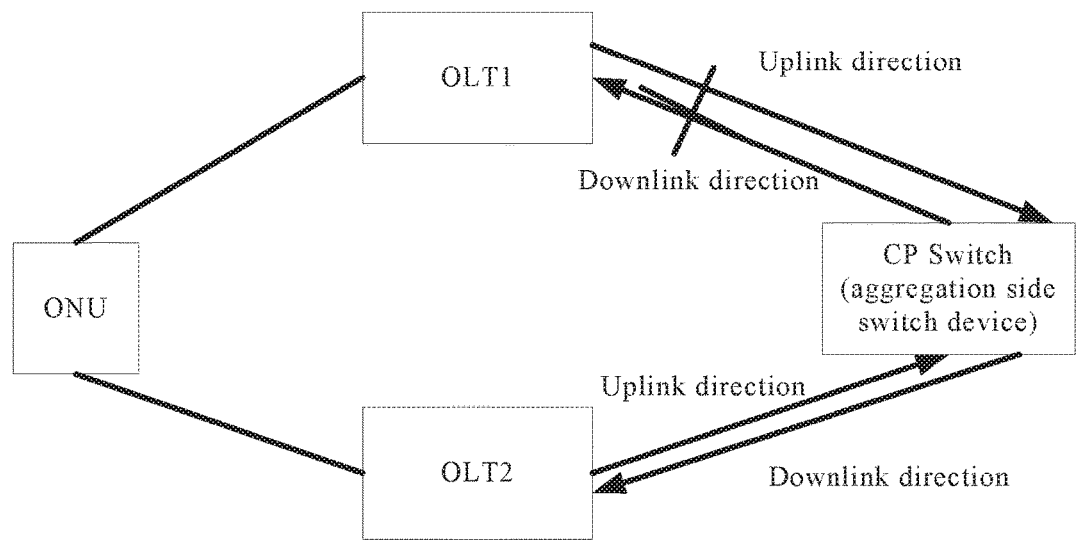
FIG. 7 is a schematic flowchart of another link switching method according to an embodiment of the present invention.

Specifically, as shown in FIG. 7, a fault occurs on an uplink link between the OLT 1 and the CP Switch, where definitions of the first link, a first sub-link of the first link, the second sub-link of the first link, a second link, a first sub-link of the second link, and a second sub-link of the second link are similar to those in the previous embodiment, and no details are repeatedly described herein. In this case, the CP Switch detects, by using the CCM, that a fault occurs on the uplink link of the second sub-link of the first link between the OLT 1 and the CP Switch.

403: The CP Switch switches service data transmission repeatedly between a second sub-link of a second link and a second sub-link of the first link at a preset frequency, so as to send an automatic protection switching message to the optical network unit until the optical network unit receives the automatic protection switching message.

Because only link switching performed by the CP Switch after the CP Switch receives the automatic protection switching message sent by the ONU belongs to effective switching, in this case, the CP Switch sends the APS message to the ONU by means of tentative link switching to notify the ONU of the occurrence of the link fault, so that the ONU performs a corresponding operation.

404: The ONU receives the APS message, and acquires information about a fault of a link between the optical network unit and the optical line terminal by using a CCM.

Specifically, the ONU detects, by using the CCM, that the fault occurs on the uplink link of the second sub-link of the first link between the OLT 1 and the CP Switch, and acquires a location of the faulty link and fault information. The fault information may include a fault cause and the like.

405: The ONU assesses the fault of the link between the ONU and the OLT 1.

In this embodiment, this step is the same as step 203 in the previous embodiment, and no details are repeatedly described herein.

406: The ONU performs switching from a first sub-link of the first link to a first sub-link of the second link.

In this embodiment, this step is the same as step 204 in the previous embodiment, and no details are repeatedly described herein.

407: The ONU sends a notification message to an OLT 2.

In this embodiment, this step is the same as step 305 in the previous embodiment, and no details are repeatedly described herein.

408: The ONU sends an AVC (Attribute Value Change) message to the OLT 1.

Specifically, this step is the same as step 306 in the previous embodiment, and no details are repeatedly described herein.

409: After the OLT 2 enables a port, the ONU sends an automatic protection switching message to the CP Switch.

In this embodiment, this step is the same as step 206 in the previous embodiment, and no details are repeatedly described herein.

410: The CP Switch performs switching from the second sub-link of the first link to the second sub-link of the second link.

In this embodiment, this step is the same as step 206 in the previous embodiment, and no details are repeatedly described herein.

This embodiment of the present invention provides a link switching method, where an optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

Figure 8:
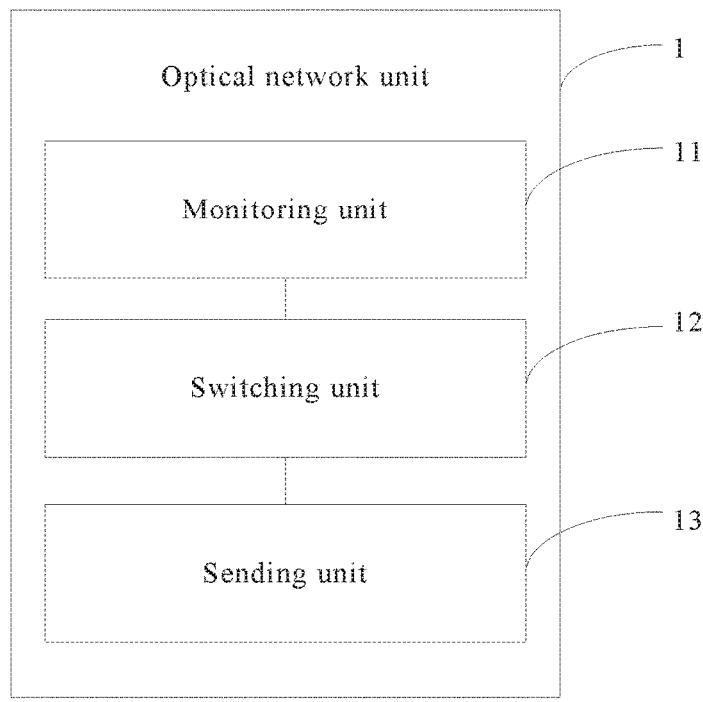
FIG. 8 is a schematic structural diagram of an optical network unit according to an embodiment of the present invention.

An embodiment of the present invention further provides an optical network unit 1, and as shown in FIG. 8, the optical network unit 1 includes: a monitoring unit 11, configured to transmit a monitoring packet through a first Maintenance association End Point on a first link connected to an aggregation side switch device, so as to monitor the first link, where the first link includes a first sub-link between the optical network unit 1 and a first optical line terminal, and a second sub-link between the first optical line terminal and the aggregation side switch device; a switching unit 12, configured to perform switching from the first sub-link of the first link to a first sub-link of a second link if it is detected that a link fault occurs on the first link, where the second link is a link, except the first link, between the optical network unit 1 and the aggregation side switch device, and the first sub-link of the second link is a link between the optical network unit and a second optical line terminal; and a sending unit 13, configured to send a notification message to the second optical line terminal, where the notification message is used to notify the second optical line terminal of occurrence of link switching and a cause for the switching, so that the second optical line terminal enables a transmission port, where the sending unit 13 is further configured to send an automatic protection switching message to the aggregation side switch device through a second Maintenance association End Point on the second link, where the automatic protection switching message is used to notify the aggregation side switch device of the occurrence of the link switching, so that the aggregation side switch device performs switching from the second sub-link of the first link to a second sub-link of the second link after receiving the automatic protection switching message, where the second sub-link of the second link is a link between the aggregation side switch device and the second optical line terminal.

Optionally, the link fault occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

Optionally, if the link fault occurring on the first link is the fault on the first sub-link of the first link or the fault in the downlink direction of the second sub-link of the first link, a maintenance unit 11 is further configured to: acquire, from the monitoring packet, information that the link fault occurring on the first link is the fault on the first sub-link of the first link or the fault in the downlink direction of the second sub-link of the first link.

Optionally, if the link fault occurring on the first link is the fault on the first sub-link of the first link, the notification message is a Physical Layer Operation Administration and Maintenance message.

Optionally, if the link fault occurring on the first link is the fault in the downlink direction of the second sub-link of the first link, the notification message is a PON Section Trace message; and after service data transmission is switched successfully to the first sub-link of the second link, the sending unit 13 further configured to: send an attribute value change notification to the first optical line terminal, where the attribute value change notification is used to notify the first optical line terminal of the occurrence of the link switching and the cause for the switching.

Figure 9:
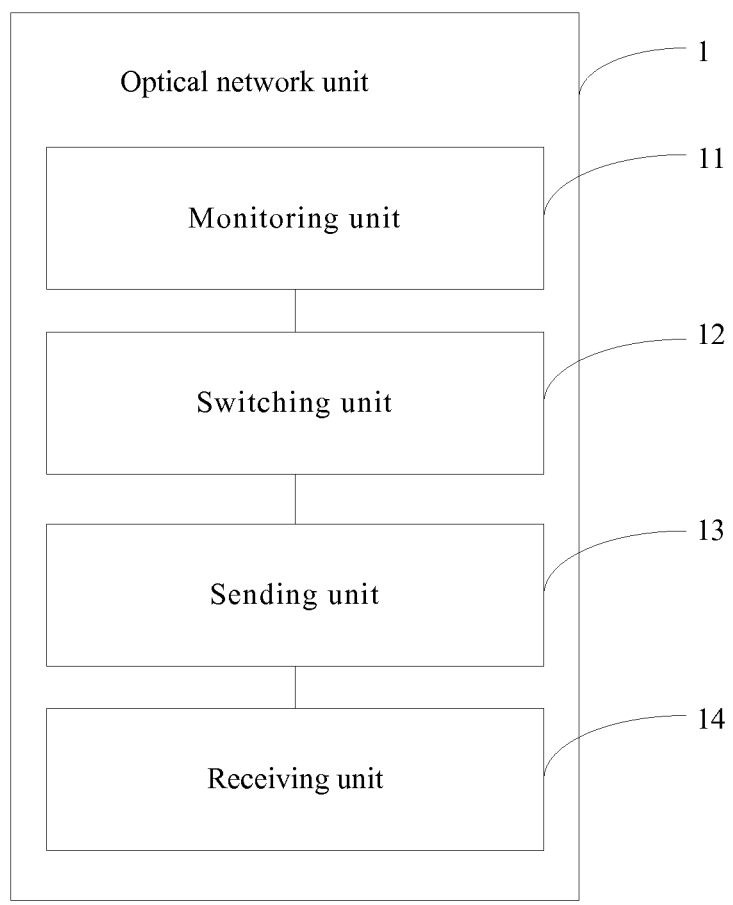
FIG. 9 is a schematic structural diagram of another optical network unit according to an embodiment of the present invention.

Optionally, as shown in FIG. 9, if the link fault is the fault in the uplink direction of the second sub-link of the first link, the notification message is a PON Section Trace message, and before the monitoring unit acquires information about the link fault on the first link from the monitoring packet, the optical network unit further includes a receiving unit 14, where the receiving unit 14 is configured to: receive the automatic protection switching message sent by the aggregation side switch device, so that after receiving the automatic protection switching message, the optical network unit acquires the information about the link fault on the first link by using the monitoring packet.

This embodiment of the present invention provides an optical network unit, where the optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

Figure 10:
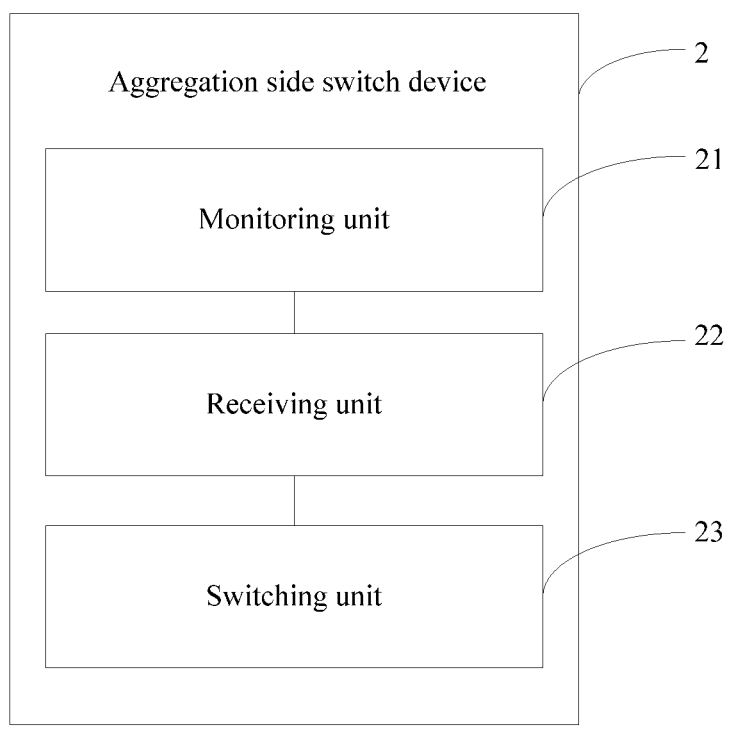
FIG. 10 is a schematic structural diagram of an aggregation side switch device according to an embodiment of the present invention.

The present invention further provides an aggregation side switch device 2, and as shown in FIG. 10, the device includes: a monitoring unit 21, configured to transmit a monitoring packet through a first Maintenance association End Point on a first link connected to an optical network unit, so as to monitor the first link, where the first link includes a first sub-link between the optical network unit and a first optical line terminal, and a second sub-link between the first optical line terminal and the aggregation side switch device; a receiving unit 22, configured to receive an automatic protection switching message that is sent through a second Maintenance association End Point on a second link by the optical network unit, where the automatic protection switching message is used to notify the aggregation side switch device of occurrence of link switching; and a switching unit 23, configured to perform switching from the second sub-link of the first link to a second sub-link of the second link after the automatic protection switching message is received, where the second sub-link of the second link is a link between the aggregation side switch device and a second optical line terminal.

Optionally, the link fault occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

Figure 11:
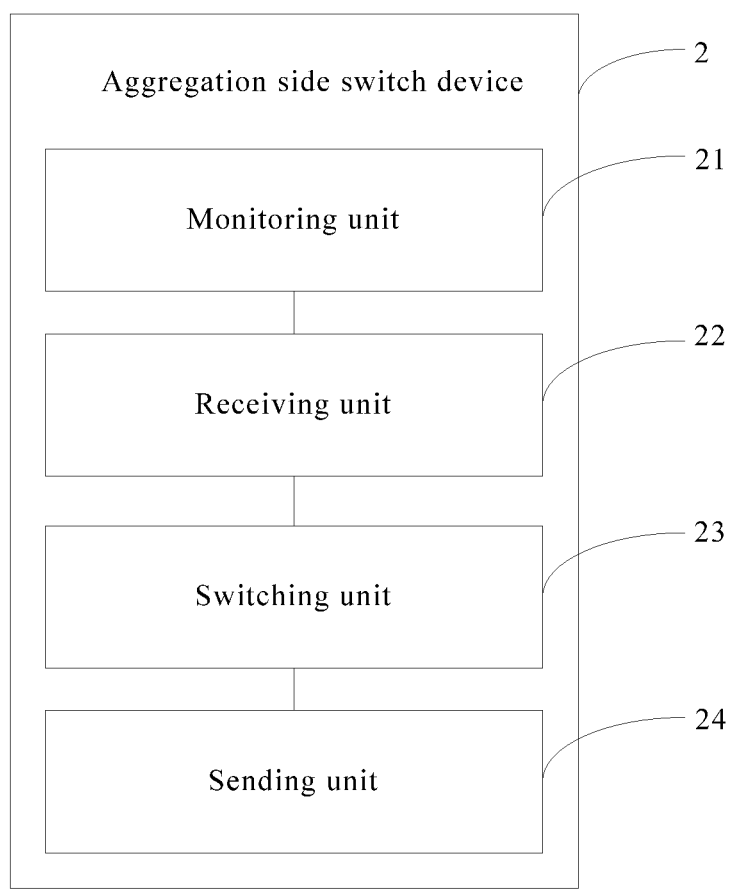
FIG. 11 is a schematic structural diagram of another aggregation side switch device according to an embodiment of the present invention.

Optionally, if the link fault occurring on the first link is the fault in the downlink direction of the second sub-link of the first link, the monitoring unit 21 is further configured to acquire, from the monitoring packet, information that the link fault occurring on the first link is the fault in the downlink direction of the second sub-link of the first link; the switching unit 23 is further configured to switch the service data transmission repeatedly between the second sub-link of the second link and the second sub-link of the first link at a preset frequency, and the switching unit 23 stops the switching after the optical network unit receives the automatic protection switching message; and the aggregation side switch device further includes a sending unit 24, and as shown in FIG. 11, the sending unit 24 is configured to: after the switching unit 23 switches the service data transmission between the second sub-link of the second link and the second sub-link of the first link, send the automatic protection switching message to the optical network unit by using the link on which no service data is transmitted.

This embodiment of the present invention provides an aggregation side switch device, where after a second optical line terminal enables a transmission port, the aggregation side switch device receives an automatic protection switching message that is sent through a second Maintenance association End Point on a second link by an optical network unit, and the aggregation side switch device performs switching from a second sub-link of a first link to a second sub-link of the second link after receiving the automatic protection switching message. Therefore, a link switching mechanism is provided, so as to implement rapid linkage switching of links between devices.

Figure 12:
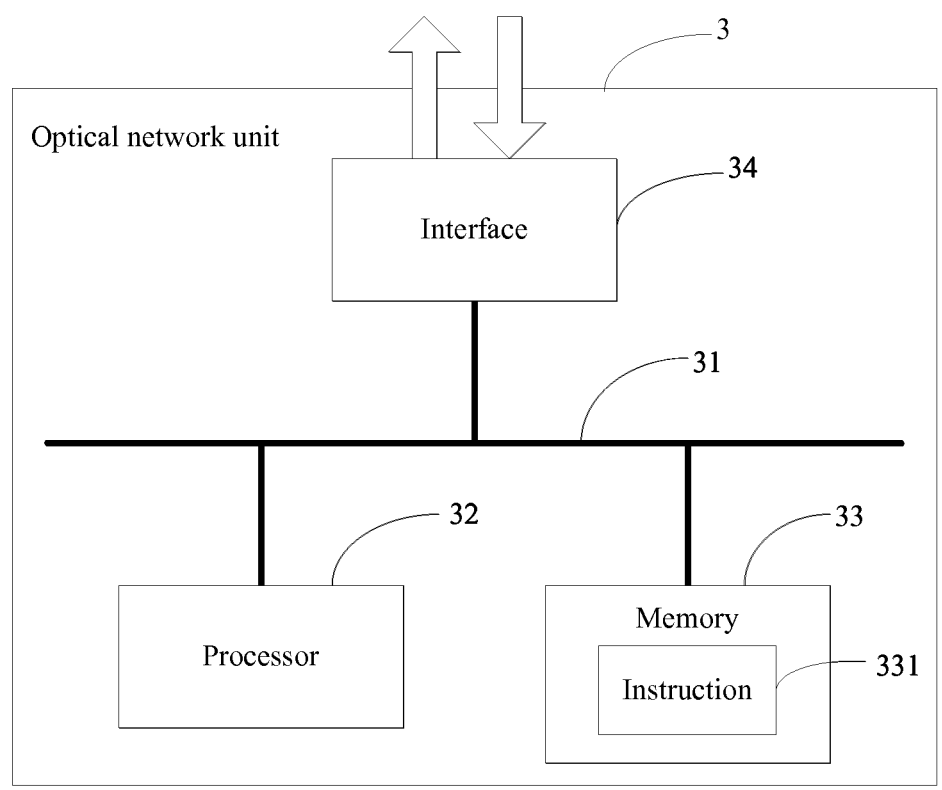
FIG. 12 is a schematic structural diagram of another optical network unit according to an embodiment of the present invention.

An embodiment of the present invention further provides an optical network unit 3, and as shown in FIG. 12, the optical network unit 3 includes a bus 31, and a processor 32, a memory 33, and an interface 34 that are connected to the bus, where the interface 34 is used to communicate with another network element, the memory 33 is used to store an instruction 331, and the processor 32 executes the instruction 331 and is configured to: transmit a monitoring packet through a first Maintenance association End Point on a first link connected to an aggregation side switch device, so as to monitor the first link, where the first link includes a first sub-link between the optical network unit and a first optical line terminal, and a second sub-link between the first optical line terminal and the aggregation side switch device; perform switching from the first sub-link of the first link to a first sub-link of a second link if it is detected that a link fault occurs on the first link, where the second link is a link, except the first link, between the optical network unit and the aggregation side switch device, and the first sub-link of the second link is a link between the optical network unit and a second optical line terminal; send a notification message to the second optical line terminal, where the notification message is used to notify the second optical line terminal of occurrence of link switching and a cause for the switching, so that the second optical line terminal enables a transmission port; and send an automatic protection switching message to the aggregation side switch device through a second Maintenance association End Point on the second link, where the automatic protection switching message is used to notify the aggregation side switch device of the occurrence of the link switching, so that the aggregation side switch device performs switching from the second sub-link of the first link to a second sub-link of the second link after receiving the automatic protection switching message, where the second sub-link of the second link is a link between the aggregation side switch device and the second optical line terminal Optionally, the link faults occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

Optionally, the processor 32 executes the instruction 331 and is configured to acquire, from the monitoring packet, information that the link fault occurring on the first link is the fault on the first sub-link of the first link or the fault in the downlink direction of the second sub-link of the first link.

Optionally, if the link fault occurring on the first link is the fault on the first sub-link of the first link, the notification message is a Physical Layer Operation Administration and Maintenance message.

Optionally, the processor 32 executes the instruction 331 and is configured to: send an attribute value change notification to the first optical line terminal, where the attribute value change notification is used to notify the first optical line terminal of the occurrence of the link switching and the cause for the switching.

Optionally, the processor 32 executes the instruction 331 and is configured to: receive the automatic protection switching message sent by the aggregation side switch device, so that after receiving the automatic protection switching message, the optical network unit acquires the information about the link fault on the first link by using the monitoring packet.

This embodiment of the present invention provides an optical network unit, where the optical network unit transmits a monitoring packet through a first Maintenance association End Point on a first link connected to the optical network unit and an aggregation side switch device, so as to monitor the first link; the optical network unit performs switching from a first sub-link of the first link to a first sub-link of a second link if it is detected that a link fault occurs on the first link; the optical network unit sends a notification message to a second optical line terminal, so that the second optical line terminal enables a transmission port; and the optical network unit sends an automatic protection switching message to the aggregation side switch device through a second Maintenance association End Point on the second link, so that the aggregation side switch device performs switching from a second sub-link of the first link to a second sub-link of the second link after receiving the automatic protection switching message. Therefore, a link switching mechanism is provided, so as to implement rapid linkage switching of links between devices.

Figure 13:
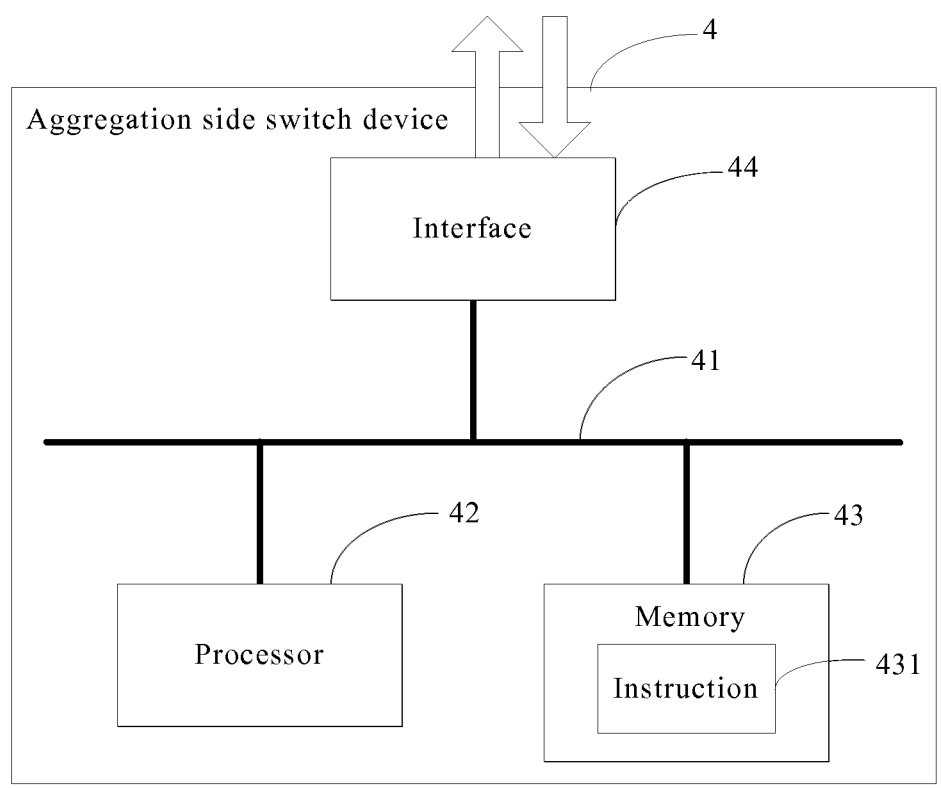
FIG. 13 is a schematic structural diagram of another aggregation side switch device according to an embodiment of the present invention.

An embodiment of the present invention further provides an aggregation side switch device 4, and as shown in FIG. 13, the optical network unit 4 includes a bus 41, and a processor 42, a memory 43, and an interface 44 that are connected to the bus, where the interface 44 is used to communicate with another network element, the memory 33 is used to store an instruction 431, and the processor 42 executes the instruction 431 and is configured to: transmit a monitoring packet through a first Maintenance association End Point on a first link connected to an optical network unit, so as to monitor the first link, where the first link includes a first sub-link between the optical network unit and a first optical line terminal, and a second sub-link between the first optical line terminal and the aggregation side switch device; receive an automatic protection switching message that is sent through a second Maintenance association End Point on a second link by the optical network unit, where the automatic protection switching message is used to notify the aggregation side switch device of occurrence of link switching; and perform switching from the second sub-link of the first link to a second sub-link of the second link after the automatic protection switching message is received, where the second sub-link of the second link is a link between the aggregation side switch device and a second optical line terminal.

Optionally, the link faults occurring on the first link is a fault on the first sub-link of the first link, a fault in a downlink direction of the second sub-link of the first link or a fault in an uplink direction of the second sub-link of the first link, where the downlink direction is a direction in which service data is transmitted from the aggregation side switch device to the first optical line terminal; and the uplink direction is a direction in which the service data is transmitted from the first optical line terminal to the aggregation side switch device.

Optionally, the processor 42 executes the instruction 431 and is configured to acquire, from the monitoring packet, information that the link fault occurring on the first link is the fault in the downlink direction of the second sub-link of the first link; switch the service data transmission repeatedly between the second sub-link of the second link and the second sub-link of the first link at a preset frequency, and stop the switching after the optical network unit receives the automatic protection switching message; and after switching the service data transmission between the second sub-link of the second link and the second sub-link of the first link, send the automatic protection switching message to the optical network unit by using the link on which no service data is transmitted.

This embodiment of the present invention provides an aggregation side switch device, where after a second optical line terminal enables a transmission port, the aggregation side switch device receives an automatic protection switching message that is sent through a second Maintenance association End Point on a second link by an optical network unit, and the aggregation side switch device performs switching from a second sub-link of a first link to a second sub-link of the second link after receiving the automatic protection switching message. Therefore, a link switching mechanism is provided, so as to implement rapid linkage switching of links between devices.

In the several embodiments provided by this application, it should be understood that the disclosed method and electronic device may be implemented in another manner. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical network unit (ONU), wherein the ONU comprises a memory storage comprising instructions; and one or more processors in communication with the memory, wherein the one or more processors execute the instructions to:
   detect that a fault occurs on a first link, wherein the first link comprises a first sub-link between a first port of the ONU and a first optical line terminal (OLT), and a second sub-link between the first OLT and an aggregation side switch device, the first port of the ONU being a port corresponding to the first link;
   perform switching from the first sub-link of the first link to a first sub-link of a second link, wherein the second link is a link, except the first link, between a second port of the ONU and the aggregation side switch device, the second port of the ONU being a port corresponding to the second link, the first sub-link of the second link being a link between the second port of the ONU and a second OLT, wherein the second link further comprises a second sub-link between the aggregation side switch device and the second OLT;
   send, via the first sub-link of the second link, a notification message to the second OLT to notify the second OLT of occurrence of link switching and a cause for the link switching, so that the second OLT enables a transmission port; and
   send an automatic protection switching message to the aggregation side switch device through the second port of the ONU on the second link to notify the aggregation side switch device of the occurrence of the link switching, so that the aggregation side switch device performs switching from the second sub-link of the first link to the second sub-link of the second link in response to receiving the automatic protection switching message.

2. The ONU according to claim 1, wherein
   the detected link fault occurring on the first link is a fault on the first sub-link of the first link, or a fault in a downlink direction of the second sub-link of the first link; and
   the downlink direction of the second sub-link of the first link is a direction in which service data is transmitted from the aggregation side switch device to the first OLT.

3. The ONU according to claim 2, wherein the one or more processors further execute the instructions to: acquire information associated with the fault on the first sub-link of the first link or the fault in the downlink direction of the second sub-link of the first link.

4. The ONU according to claim 2, wherein if the detected link fault occurring on the first link is the fault on the first sub-link of the first link, the notification message is a Physical Layer Operation Administration and Maintenance message (PLOAM).

5. The ONU according to claim 2, wherein if the detected link fault occurring on the first link is the fault in the downlink direction of the second sub-link of the first link, the notification message is a PON Section Trace message; and after service data transmission is successfully switched to the first sub-link of the second link, the one or more processors further execute the instructions to: send an attribute value change notification to the first OLT to notify the first OLT of the occurrence of the link switching and the cause for the switching.

6. A link switching system, comprising:
   at least two optical line terminals (OLTs);
   at least one optical network unit (ONU); and
   an aggregation side switch device;
   wherein the ONU comprises a memory storage comprising instructions; and one or more processors in communication with the memory, wherein the one or more processors execute the instructions to:
   detect that a fault occurs on a first link, wherein the first link comprises a first sub-link between a first port of the ONU and a first optical line terminal (OLT), and a second sub-link between the first OLT and an aggregation side switch device, the first port of the ONU being a port corresponding to the first link;
   perform switching from the first sub-link of the first link to a first sub-link of a second link, wherein the second link is a link, except the first link, between a second port of the ONU and the aggregation side switch device, the second port of the ONU being a port corresponding to the second link, the first sub-link of the second link being a link between the second port of the ONU and a second OLT, wherein the second link further comprises a second sub-link between the aggregation side switch device and the second OLT;

send, via the first sub-link of the second link, a notification message to the second OLT to notify the second OLT of occurrence of link switching and a cause for the link switching, so that the second OLT enables a transmission port;

send an automatic protection switching message to the aggregation side switch device through the second port of the ONU on the second link to notify the aggregation side switch device of the occurrence of the link switching, so that the aggregation side switch device performs switching from the second sub-link of the first link to the second sub-link of the second link in response to receiving the automatic protection switching message.

7. A link switching method, the method comprising:

detecting, by an optical network unit (ONU), a fault occurs on a first link, wherein the first link is connected to the ONU and an aggregation side switch device;

performing, by the ONU, switching from a first sub-link of the first link to a first sub-link of a second link;

sending, by the ONU, a notification message to a second optical line terminal (OLT) to notify the second OLT of occurrence of link switching and a cause for the link switching, so that the second OLT enables a transmission port; and sending, by the ONU, an automatic protection switching message to the aggregation side switch device through a second port of the ONU on the second link to notify the aggregation side switch device of the occurrence of the link switching, so that in response to receiving the automatic protection switching message, the aggregation side switch device performs switching from a second sub-link of the first link to a second sub-link of the second link.

8. The method according to claim 7, wherein the detected link fault occurring on the first link is:

a fault on the first sub-link of the first link, or a fault in a downlink direction of the second sub-link of the first link, wherein the downlink direction is a direction in which service data is transmitted from the aggregation side switch device to the first OLT.

9. The method according to claim 8, wherein if the detected link fault is the fault on the first sub-link of the first link, the notification message is a Physical Layer Operation Administration and Maintenance message (PLOAM).

10. The method according to claim 8, wherein if the detected link fault is the fault in the downlink direction of the second sub-link of the first link, the notification message is a PON Section Trace message; and further comprising after the service data transmission is successfully switched to the first sub-link of the second link, sending, by the ONU, an attribute value change notification to the first OLT to notify the first OLT of the occurrence of the link switching and the cause for the switching.

* * * * *